United States Patent [19]
Kudoh

[11] Patent Number: 6,041,218
[45] Date of Patent: Mar. 21, 2000

[54] DEVICE AND METHOD FOR FACILITATING SELECTION OF A SELECTIVE CALLING RECEIVER RADIO AREA

[75] Inventor: Kazuhiro Kudoh, Shizuoka, Japan

[73] Assignee: NEC Corporation, Tokyo, Japan

[21] Appl. No.: 08/869,907

[22] Filed: Jun. 5, 1997

[30] Foreign Application Priority Data

Jun. 12, 1996 [JP] Japan ................................. 8-150835

[51] Int. Cl.[7] .................................................. H04B 7/00
[52] U.S. Cl. ..................... 455/38.4; 455/458; 455/31.2; 455/567; 340/825.44
[58] Field of Search .................................. 455/31.3, 31.2, 455/38.1, 38.4, 422, 434, 458, 566, 567; 340/825.44

[56] References Cited

U.S. PATENT DOCUMENTS

| | | | |
|---|---|---|---|
| 5,422,733 | 6/1995 | Merchant et al. | 455/38.4 |
| 5,603,090 | 2/1997 | Nguyen et al. | 455/38.4 |
| 5,604,491 | 2/1997 | Coonley et al. | 340/825.44 |
| 5,745,481 | 4/1998 | Phillips et al. | 370/313 |
| 5,757,279 | 5/1998 | Fujiwara | 340/825.44 |
| 5,801,638 | 9/1998 | Ozaki | 340/825.44 |
| 5,832,367 | 11/1998 | Bamburak et al. | 455/434 |

FOREIGN PATENT DOCUMENTS

| | | |
|---|---|---|
| 63-226123 | 9/1988 | Japan . |
| 64-68036 | 3/1989 | Japan . |
| 2-244828 | 9/1990 | Japan . |
| 3-135119 | 6/1991 | Japan . |
| 4-181457 | 6/1992 | Japan . |
| 4-207234 | 7/1992 | Japan . |

Primary Examiner—Reinhard J. Eisenzopf
Assistant Examiner—Darnell R. Armstrong
Attorney, Agent, or Firm—Young & Thompson

[57] ABSTRACT

A selective calling receiver displays information corresponding to frequencies assigned to radio areas. When the receiver tunes a receiving frequency, a scrolling circuit of the receiver scrolls the information based on a changeable scrolling order, which may be decided automatically or by a user of the receiver.

3 Claims, 7 Drawing Sheets

DEVICE AND METHOD FOR FACILITATING SELECTION OF A SELECTIVE CALLING RECEIVER RADIO AREA

BACKGROUND OF THE INVENTION

The present invention relates to a selective calling receiver, and more particularly to a selective calling receiver that receives a plurality of frequencies which are each associated with a particular radio area.

A selective calling receiver (also known as a "pager" and referred to as a "receiver" hereinafter) has its own selective calling number for receiving calls to a user of the receiver. When a receiver receives its calling number, the receiver notifies the user and displays a message.

Both the number of subscribers and diversification of services have increased. One of the services allows the receiver to receive its calling number in any area even though the user moves among a plurality of radio areas, each of which has a different operating frequency. As the receiver is moved to a new radio area it must be tuned to the new operating frequency.

Plural such operating frequencies may be stored in the receiver for selection by the user. When the frequency is to be changed, the user can display the stored frequencies in a predetermined sequence. The sequence is stopped at the desired frequency and the receiver is tuned to that frequency. However, when the number of frequencies is large, the sequential display can take a long time.

An example of a receiver to solve the above-mentioned problem is disclosed in Japanese Patent laid-open No. H4-207234 of Jul. 29, 1992.

That receiver automatically sets a frequency assigned to the radio area where a user of the receiver has moved. More specifically, the user preliminarily stores candidate frequencies assigned to radio areas where the user moves frequently. When the user moves to another radio area, the receiver scans and sets the stored frequency automatically. In the above-mentioned Japanese publication, frequency selection may be automatic or manual.

However, if the user usually moves to a lot of radio areas, the user has to store a lot of frequencies in the receiver. Further, the receiver is slow to set an assigned frequency since a frequency tuning circuit of the receiver searches the frequency among many stored frequencies. Moreover, even if the user manually selects a frequency, the user still must search for the frequency from among many frequencies.

SUMMARY OF THE INVENTION

An object of the present invention is to provide a selective calling receiver and a method which reduce the time to determine and tune a frequency assigned to a radio area where a user of the receiver has moved.

Another object of the present invention is to provide a selective calling receiver and a method by which a description of a radio area that is determined to be most-frequently used by a user of the receiver is displayed to facilitate setting a desired frequency.

In order to achieve the above-mentioned objects, a selective calling receiver according to the present invention includes a tuning circuit for tuning a receiving frequency, a display for displaying descriptions of radio areas and a scrolling circuit for scrolling the descriptions based on a changeable scrolling sequence. The sequence may be changed to place the most frequently selected frequencies or the previous frequency at the beginning of the sequence. The receiver of the present invention may further include a setting circuit, operated by a user of the receiver who selects a receiving frequency from among many applicable frequencies based on the description displayed on the display.

Since the receiver changes the scrolling order of the description corresponding to the most-frequently used frequencies, a candidate frequency is more likely to be displayed sooner than prior art devices, and, thus, the time for selecting and setting a receiving frequency is reduced.

BRIEF DESCRIPTION OF THE DRAWINGS

These and other objects, features and advantages of the present invention will become more fully apparent from the following detailed description taken in conjunction with the accompanying drawings.

DETAILED DESCRIPTION OF PREFERRED EMBODIMENTS

Figure 1:
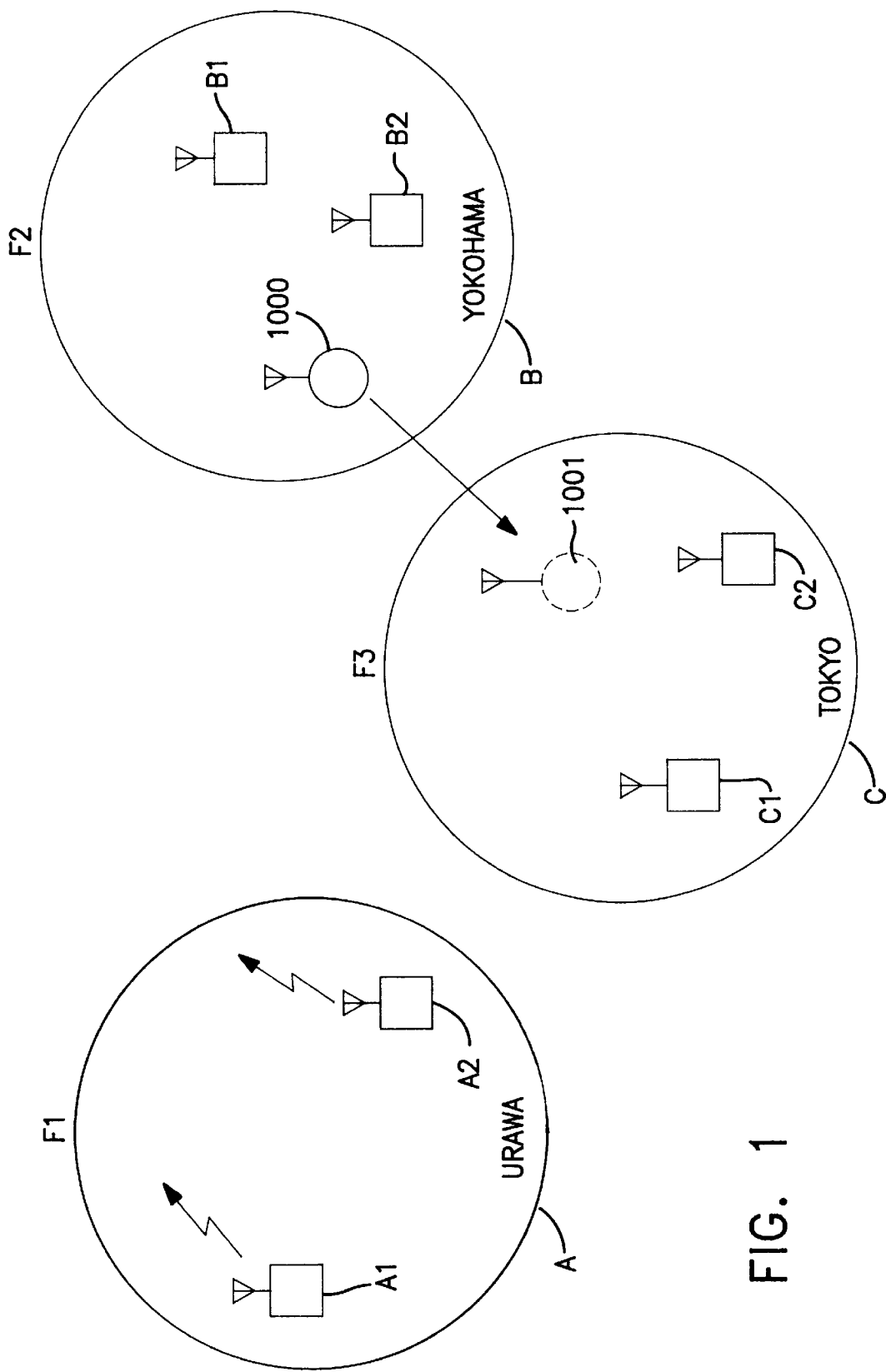
FIG. 1 shows an example of a multiple radio area paging system in which a selective calling receiver according to the present invention can operate.

In FIG. 1, frequencies F1, F2 and F3 are assigned to radio areas A (URAWA), B (YOKOHAMA) and C (TOKYO). Base stations A1 and A2 are located in the radio area A and both of them transmit a signal on a frequency F1, base stations B1 and B2 in radio area B transmit on frequency F2, and base station C1 and C2 are in radio area C and transmit on frequency F2.

Receiver channels corresponding to the frequencies F1, F2 and F3 may be assigned, and in this example are channels 1,2,3, respectively. These frequencies F1, F2 and F3 are stored in the receiver as frequencies of the radio areas where a user may be located.

Figure 2A:
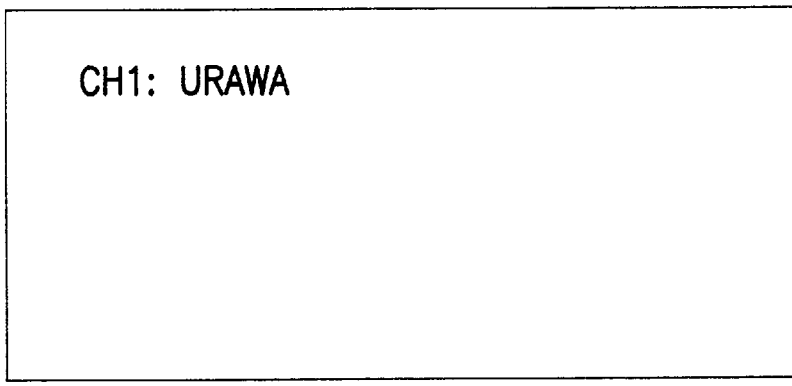
FIG. 2 (*a*)–FIG. 2(*c*) illustrate displayed channels and town's names on the display of a selective calling receiver according to the present invention.
Figure 2B:
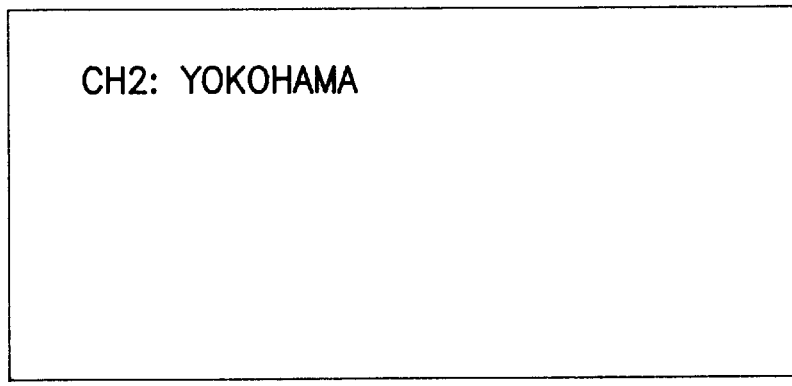
Figure 2C:
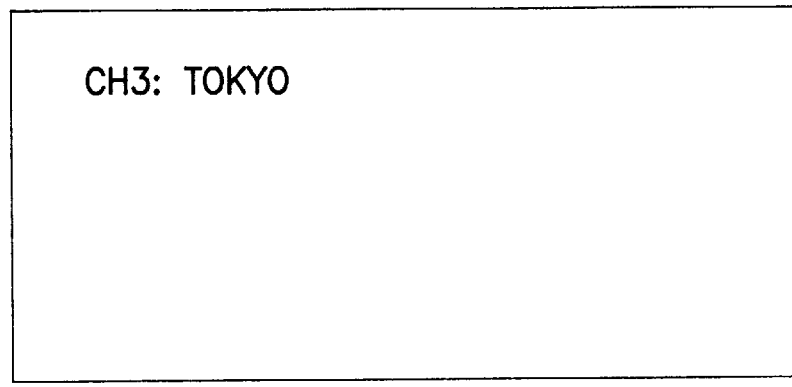

When the user moves, for example, from radio area B to the radio area C (see reference number 1000 and 1001 in FIG. 1), the user scrolls the channels sequencially on a display of the receiver starting with CH1 (see FIG. 2(*a*)). When channel CH 3 is displayed on the display (see FIG. 2(*c*) after displayed CH2 (see FIG. 2(*b*)), the user stops scrolling channels and selects CH 3, then frequency F3 is tuned in the receiver.

In accordance to the present invention, the sequence of displayed descriptions is changed so that the desired radio area is displayed more quickly.

Figure 3:
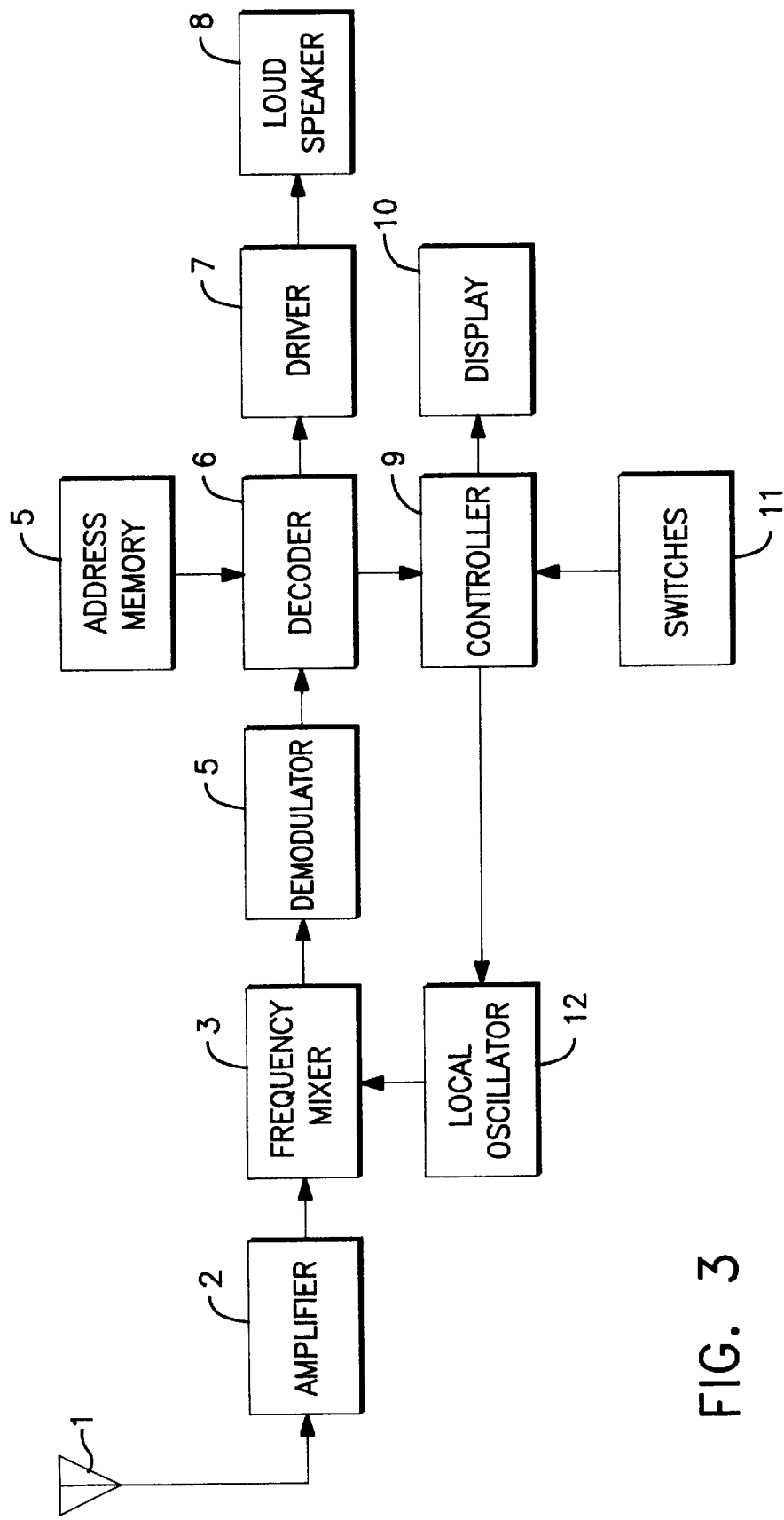
FIG. 3 is a block diagram showing a preferred embodiment of a selective calling receiver according to the present invention.

With reference now to FIG. 3, an antenna 1 receives a radio signal from a base station and outputs a received signal to an amplifier 2. The amplifier 2 amplifies the received signal supplied from the antenna 1 and outputs the amplified signal to a frequency mixer 3. The frequency mixer 3 mixes frequencies of the amplified signal and a local oscillation frequency signal from a local oscillator 12 and outputs to a demodulator 4 a mixed frequency signal which is the difference between these signals. The local oscillator 12 outputs to the frequency mixer 3 the local oscillation frequency signal having a frequency decided by a control signal from a controller 9. The demodulator 4 demodulates the mixed frequency signal, wave-shapes it and supplies the digital signal to a decoder 6. Decoder 6 detects a selective calling number from the digital signal by decoding it and outputs a coincidence signal to a driver 7 when the detected selective calling number is the same the receiver's own selective calling number which is stored in a address memory 5. The decoder 6 also detects a sync. signal and a message in the digital signal by decoding it, and thereafter supplies a decoded signal containing a decoded sync. signal and a decoded message to the controller 9. The driver 7 amplifies the coincidence signal current and outputs a drive signal. A loudspeaker 7, or similar notification on device is driven by the drive signal and notifies the user of the call.

Switches 11 are operated by the user and output command signals (as explained below) to the controller 9.

The controller 9 makes a display 10 display "ROAM", when the decoded sync. signal is not included in the decoded signal from the decoder 6 for a predetermined time period. The controller 9 also makes display 10 display the received message if the decoded signal from the decoder 6 contains the decoded message. Further, the controller 9 operates the channel sequence display mode (as explained below). Moreover, the controller 9 outputs the control signal to the local oscillator 12 after the frequency of the radio area has been determined.

Referring further to FIG. 3, an outline of the operation of the receiver will now be described.

When the controller 9 does not receive the decoded sync. signal for a predetermined time period, the receiver cannot receive its calling number. The controller 9 makes the display 10 display "ROAM" which means that the receiver cannot receive its calling number since the user has moved to another radio area. When the user notices that "ROAM" is displayed, the user operates the switches 11 for setting the frequency assigned to the radio area to which the user has moved. The switches 11, in response to this operation, output the command signals to the controller 9 and controller 9 makes the display 10 scroll channels and name (URAWA, YOKOHAMA or TOKYO). The scroll of the channels and the names take a predetermined order in which the more frequently used, or the previous radio area's frequency are moved to the beginning of the sequence of displayed descriptions which are scrolled on display 10 (as explained below). When the channel corresponding to the name where the user has moved is displayed, the switches 11 are operated and the switches 11 output command signals to the controller 9. The controller 9, in response to the command signals, outputs the control signal to the local oscillator 12. The local oscillator outputs the oscillation frequency for tuning the selected frequency to the frequency mixer 3.

If the user changes the displaying order, the user operates the switches 11 and sets the order while watching the display 10. When the channel displaying order is decided, the controller 9 stores it therein.

Next, an appropriate configuration of the controller 9 and switches 11 will be described with reference to FIG. 4.

Figure 4:
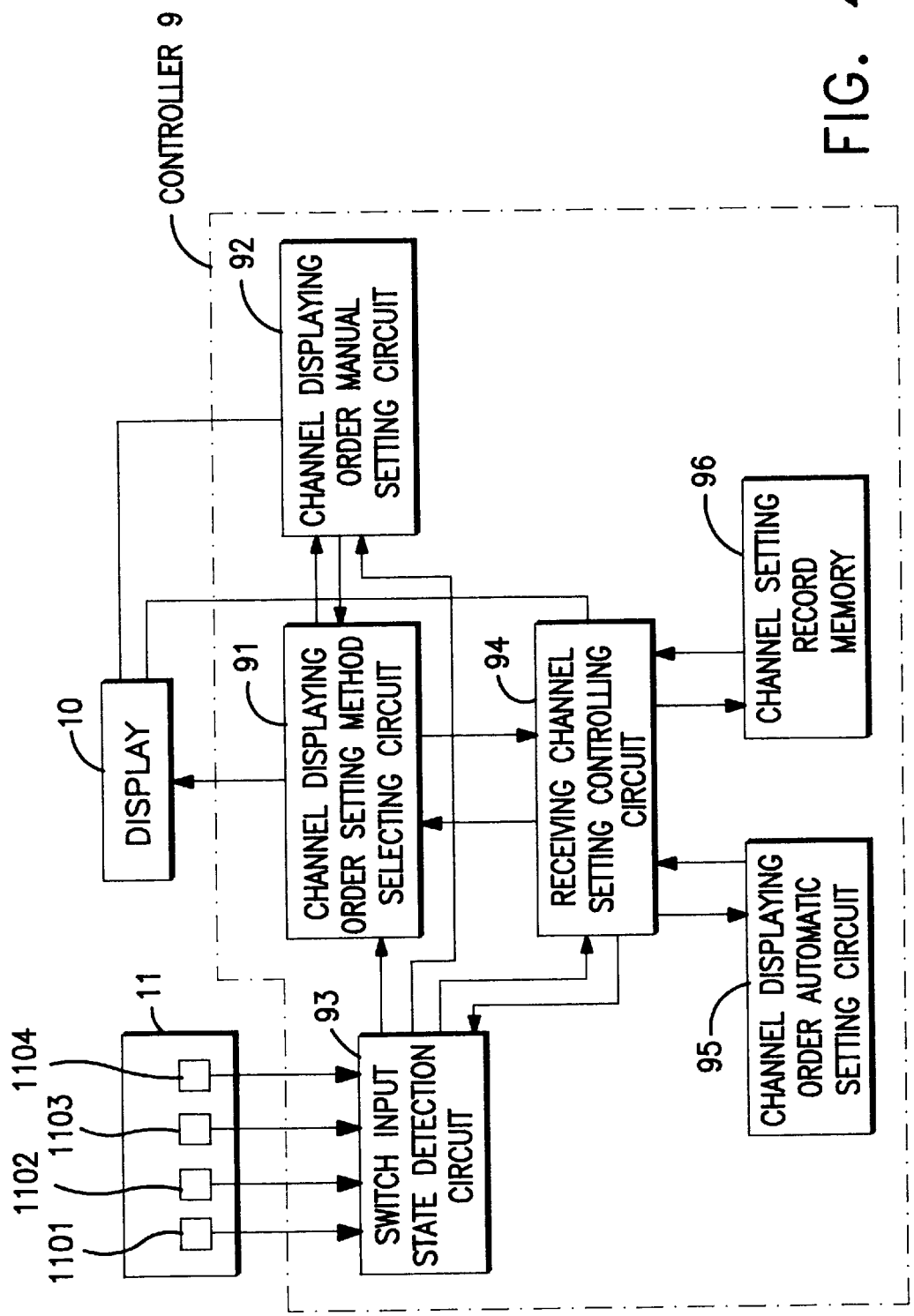
FIG. 4 is a block diagram showing a detailed structure of a controller of the selective calling receiver illustrated in FIG. 3.

The switches 11 illustrated in FIG. 4 include a plurality of switches 1101 to 1104 which control the operation for selecting and setting a channel and the channel displaying order.

The controller 9 includes a channel displaying order setting method selecting circuit 91 (referred to as the circuit 91), a channel displaying order manual setting circuit 92 (referred to as the circuit 92), a switch input state detection circuit 93 (referred to as the circuit 93), a receiving channel setting control circuit 94 (referred to as the circuit 94), a channel displaying order automatic setting circuit 95 (referred to as the circuit 95) and channel setting record memory 96 (referred to as the memory 96). The controller 9 may consist of a microprocessor and the functions of the above-circuits may be achieved by software or by conventional components.

The circuit 91 selects either a channel displaying order manual setting mode (referred to as manual mode) or a channel displaying order automatic setting mode (referred to as the automatic mode) by the operation of the switches 11. The circuit 92 manually sets an order for displaying applicable channels one by one from a plurality of radio areas on display 10. The circuit 93 detects pushed states of switches 11 and outputs information indicating the pushed switches 11. The circuit 94 determines a receiving channel and whether an output from the circuit 92 or the circuit 95 has been selected by circuit 91. The circuit 95 automatically sets an order for displaying applicable channels one by one from a plurality of radio channels on the display 10. The memory 96 stores the record of the receiving channel set by the circuit 94.

Figure 6:
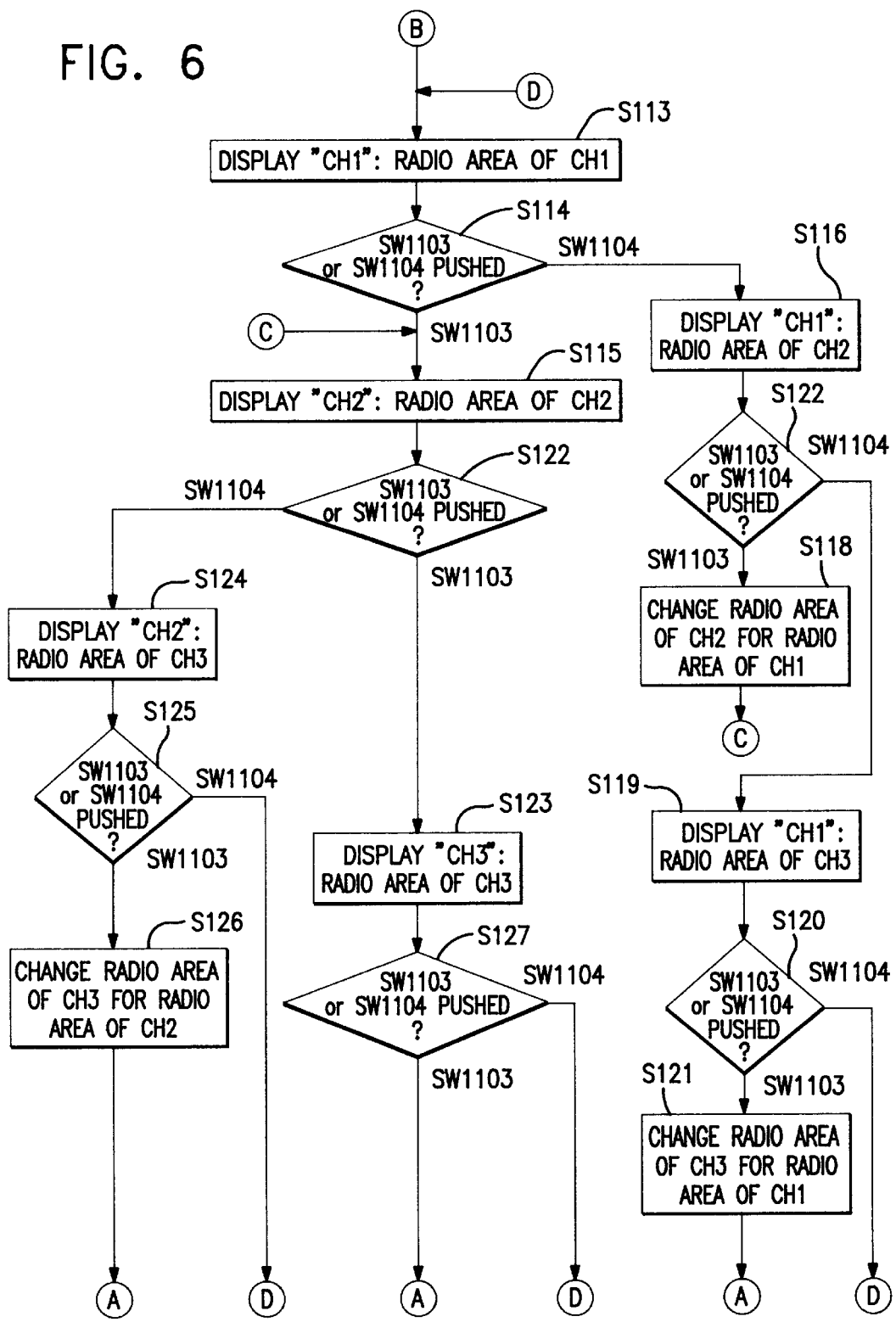
FIG. 6 is a second divided view of a flowchart showing an example of the operation of the selective calling receiver illustrated in FIG. 3.
Figure 7:
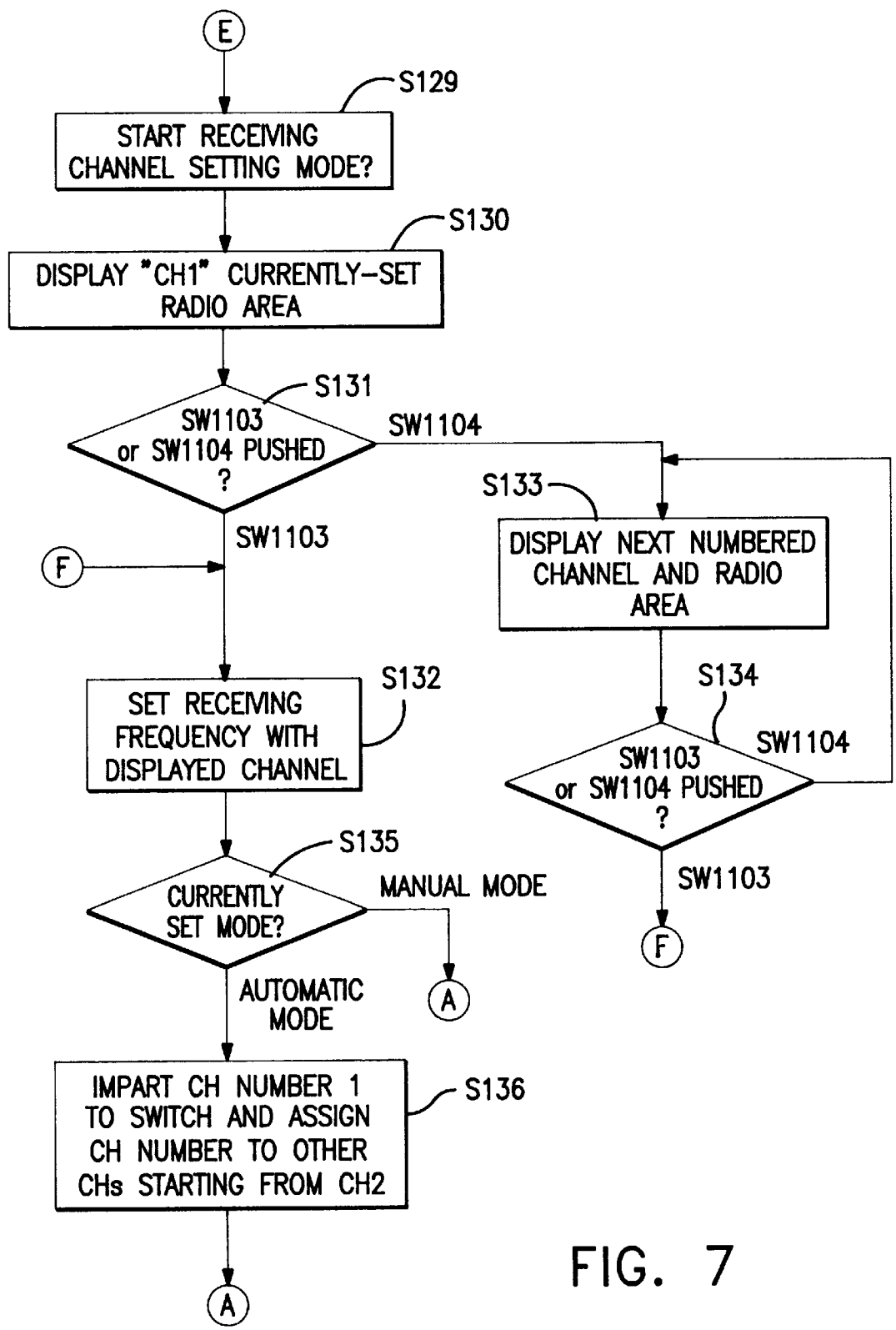
FIG. 7 is a third divided view of a flowchart showing an example of the operation of the selective calling receiver illustrated in FIG. 3.

The operation of the controller 9 will now be described with reference to FIGS. 5 through 7.

Figure 5:
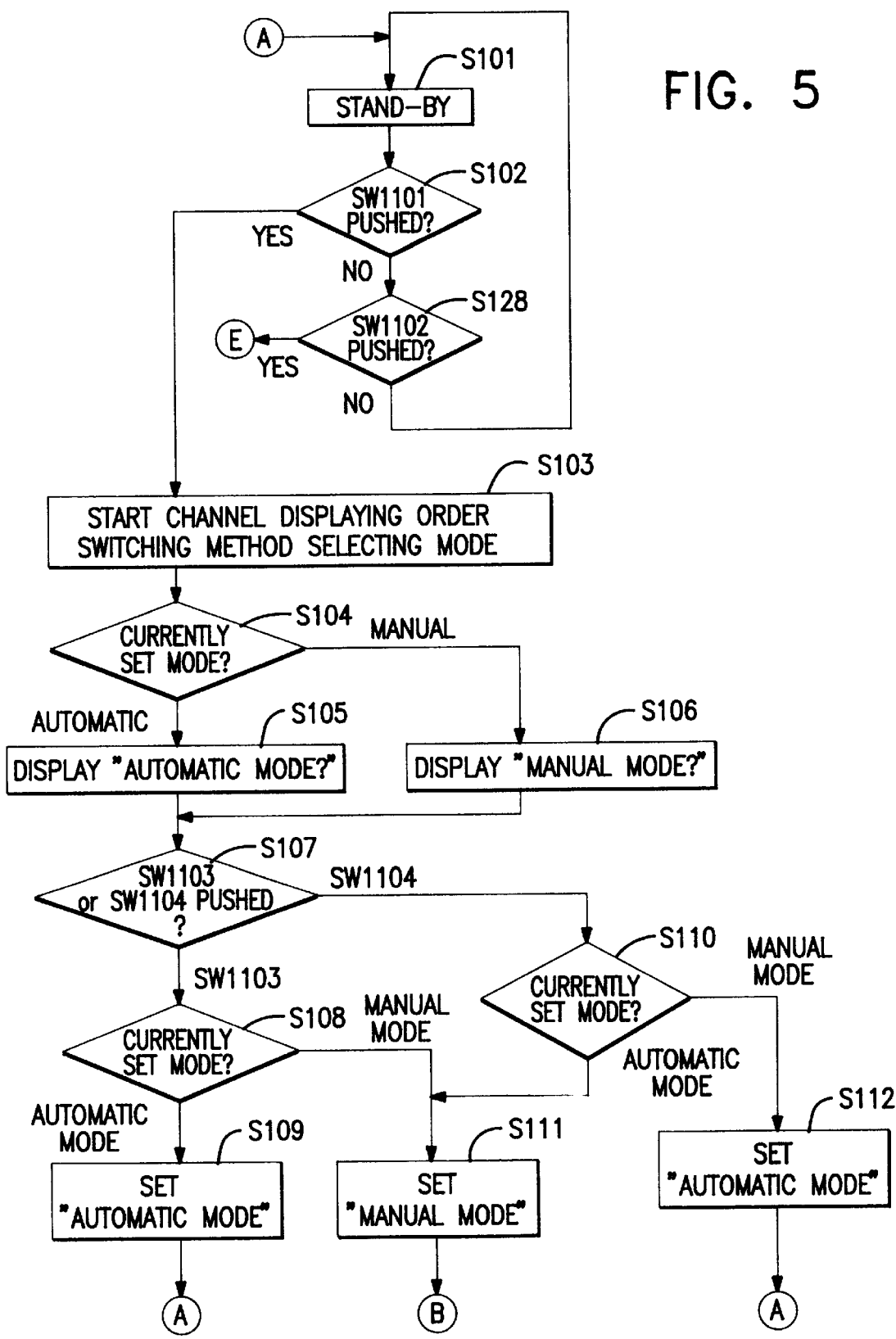
FIG. 5 is a first divided view of a flowchart showing an example of the operation of the selective calling receiver illustrated in FIG. 3.

Referring to FIG. 5, in the standby mode (step S101), when the switch 1101 of the switches 11 is pushed (S102), the circuit 93 detects that the switch 1101 has been pushed and informs the circuit 94 that the switch 1101 has been pushed. In response this information, the circuit 94 informs the circuit 91 of the pushed state of the switch 1101. Upon being informed of the pushed state of the switch 1101, the circuit 91 enters the state for operating the channel displaying order setting method selecting mode. In the method selecting mode, the user sets operation in either the manual mode or automatic mode. In the automatic mode it is possible automatically to change and set the applicable channel displaying order based on the past record of a frequency associated in the radio area where a user has moved. Thus, the frequency assigned to the radio area where a user sometimes has moved is automatically set to the small numbered channel (beginning of the display sequence). On the other hand, in the manual mode, it is possible to manually change and set the applicable channel displaying order by the switch operation of the switches 11. Thus, the user can set the frequency assigned to the radio area where the user sometimes has moved to the small numbered channels.

Selection and setting of either the automatic mode or the manual mode are performed by operating the switches 1103 and 1104. That is, the display 10 displays the mode already set mode before performing selection and setting in order to confirm the set mode.

The display 10 displays the message "AUTOMATIC MODE?" in the sense of making an inquiry about continuation of the automatic mode if the automatic mode has been set (S105). The display 10 similarly displays "MANUAL MODE?" if the manual mode is set (S106). Display of "AUTOMATIC MODE?" and "MANUAL MODE?" in S105 and S106 is an inquiry from the receiver to the user and corresponds to a screen for determing whether the current mode is to be continued, or a new mode selected.

If the automatic mode is continued in the step S105, the switch 1103 which is a switch for selecting the mode currently displayed in the display 10, may be pushed (S107). On the other hand, if a new selection is made to switch to the manual mode in S107, the switch 1104 which is a switch for setting a mode different from the mode currently displayed may be pushed.

When either switches 1103 or 1104 are pushed for setting the either mode in steps S105 and S106, the circuit 93 informs the circuit 91 of this detection. If the mode is not changed, or after the mode has been changed, the receiver returns to the standby mode (S101).

The following describes how the order for displaying a plurality of channels on the display 10 is set when setting the receiving channel in the manual mode.

Since the description will be given as to a case of a plurality of channels, i.e., three channels when setting the receiving channel, the three channels CH1, CH2 and CH3 are sequentially displayed (see FIGS. 2). It assumes that the three channels CH1, CH2 and CH3 corresponds to radio areas URAWA, TOKYO and YOKOHAMA, and also correspond to the frequencies of f1, f2 and f3. The channels are displayed in numerical order.

Upon setting the manual mode in S111, the circuit 91 informs the circuit 92 of this setting. The circuit 92 displays a message CH1 and its radio area URAWA on the display 10 (step S113). The CH1 represents a channel firstly displayed as an applicable channel when setting the receiving channel, and the radio area URAWA simultaneously displayed is an applicable area. That is, in the three channels sequentially displayed on the display 10 when setting the receiving channel, the receiving frequency of the firstly-displayed the CH1 is a frequency corresponding with radio area displayed on the screen. In case of setting the receiving channel, when the radio area corresponding with the receiving channel is set in regard of the firstly-displayed CH1, the frequency corresponding with that radio area is set as a channel frequency of CH1. If the switch 1103 is further pushed (S114), the circuit 93 informs the circuit 92. Since the switch 1103 is a switch having a function for displaying radio area YOKOHAMA of the CH2 which is a channel displayed after the CH1 (S115).

If the switch 1104 is pushed instead of the switch 1103 in S114, since the switch 1104 is a switch for switching the radio area corresponding with this frequency of the channel displayed in the display 10, the channel and radio area CH2 YOKOHAMA are displayed following the display of CH1. That is, in place of URAWA with CH1, the display 10 displays YOKOHAMA with CH1 (S116). Thus, the radio area of CH1 of radio area becomes that of the CH2, and it is determined that the town URAWA and the corresponding frequency of CH1 are switched to those of the CH2 YOKOHAMA(S118), whereby the control advances to S115 to display the radio area of CH2 as URAWA. This means that the radio areas firstly displayed and that secondly displayed when setting the previous receiving channel are displayed in the opposite order when setting the subsequent receiving channel.

If the switch 1104 is pushed again instead of the switch 1103 in S117, TOKYO is displayed following the display of CH1 (S119). When the switch 1103 is pushed in S120, switching between the radio area of CH1 and CH3 is effected (S121).

When the switch 1103 is pushed (S122) with the radio area of CH2 YOKOHAMA being displayed in S115, CH2 YOKOHAMA is not changed and the control advances to the next mode for displaying the radio area of the CH3 TOKYO (S123). However, when the switch 1104 is pushed instead of the switch 1102 in S122, the exchange of the CH3 TOKYO is displayed following the display of CH2 in place of the radio areas of the CH2 YOKOHAMA(S124). If the switch 1103 is pushed (S125) in the state of S124, switching between the radio area of the CH2 and the CH3 is effected (S126). If it is desired to set the radio area once again, pushing the switch 12 in S125 involves the control to return to display of the radio area of the CH1 (S113), thus enabling resetting.

The sequence of display changed and set in the manual mode is stored in the circuit 92.

When the switch 1102 is pushed in the standby mode (S128 in FIG. 6), the pushed state is detected by the circuit 93 which informs the circuit 94. The circuit 94 operates the receiving channel setting function (referred to as receiving channel setting mode; S129 in FIG. 7) and a channel number and the radio area which have been already set are displayed on the display section (S130). However, when the corresponding relationship between the respective channels and the radio area is thereafter changed in the manual mode, a new channel corresponding with the radio area equal to that of the channel which was set as the receiving channel when setting the previous receiving channel is displayed together with its radio area.

The flow of operation in the automatic mode will be described next.

After setting the new receiving channel in S132, the circuit 94 confirms whether the mode is set to the automatic mode or the manual mode (S135). If the mode is the automatic mode, the circuit 94 so informs the circuit 95. Upon receiving this information, the circuit 95 determines the sequence in which the radio area are to be displayed. The sequence may be based on frequency of use, or the previously used radio area may be first, or other schemes may be used.

A result of the automatic setting by the circuit 95 is stored in the memory 96. When the circuit 95 informs the circuit 94 that the automatic setting operation is completed, the receiving channel setting function operating state is terminated, and the receiver returns to the standby mode (S101). Further, if the channel displaying order setting method selecting mode corresponds to the manual mode in S135, the receiving channel setting function operating state is terminated and the control returns to the standby mode in S101.

In this embodiment, display 10 displays a radio area name as an example, although other description such as a telephone number prefix may be used.

As described above, since the selective calling receiver according to the present invention has a high probability of selecting a frequency for a radio area where the user has moved, it is possible to reduce the time needed to set a frequency when the user has moved to another radio area.

Obviously, numerous modifications and variations of the present invention are possible in light of the above teachings. It is, therefore, to be understood that within the scope of the appended claims, the present invention may be practiced otherwise than as specifically described herein.

What is claimed is:

1. A selective calling receiver comprising:
   a tuning circuit for tuning a receiving frequency;
   a display for describing radio areas, each of which is associated with a particular receiving frequency;

a scrolling circuit for scrolling the described radio areas on the display and for changing a scrolling order of the described radio areas; and a setting circuit, operated by a user of the receiver, for selecting one of the radio areas and its respective receiving frequency based on said display, and for setting the selected radio area and receiving frequency at said tuning circuit, wherein said scrolling circuit comprises a deciding circuit for changing said scrolling order so that the selected radio area and associated receiving frequency has a priority in the scrolling order, and wherein said deciding circuit comprises an automatic deciding circuit for deciding said scrolling order based on a past setting of a receiving frequency.

2. A selective calling receiver comprising:

a tuning circuit for tuning a first receiving frequency assigned to a radio area where a bearer of the receiver has moved; and a setting circuit for selecting said first receiving frequency from among a plurality of receiving frequencies based on a predetermined selecting order of the plurality of receiving frequencies, wherein said first receiving frequency has a priority in said selecting order, wherein said setting circuit comprises:

an automatic circuit for deciding said selecting order based on a past setting record of the plurality of receiving frequencies, in which order a latest set receiving frequency is selected and set first in the selecting order.

3. A paging receiver comprising:

a tuner for tuning the paging receiver to one of plural receiving frequencies which are each associated with one of plural radio areas;

a display for selectively describing a one of the radio areas;

a scroller for sequentially displaying on said display the descriptions of each of the plural radio areas, said scroller comprising means for changing the sequence of the displayed descriptions; and a setting circuit for instructing said tuner to tune the paging receiver to the one of the receiving frequencies associated with the one of the radio areas described on said display, wherein said means for changing the sequence of the displayed descriptions comprises an automatic selector with a processor for determining a sequence which is likely to display a description of a one of the radio areas in which the paging receiver is located at a beginning of the sequence of displayed descriptions, and wherein said processor identifies and stores the most frequently tuned ones of the receiver frequencies and places the stored ones of the receiver frequencies at the beginning of the sequence of displayed descriptions.

* * * * *